United States Patent [19]

Ohta et al.

[11] Patent Number: 4,902,545
[45] Date of Patent: Feb. 20, 1990

[54] BOOT FOR AUTOMOBILE

[75] Inventors: Satoshi Ohta, Konan; Mashiro Takimoto, Mie; Yoshio Yamazaki; Haruyasu Mizutani, both of Aichi, all of Japan

[73] Assignee: Toyoda Gosei Co., Ltd., Nishikasugai, Japan

[21] Appl. No.: 208,076

[22] Filed: Jun. 17, 1988

[30] Foreign Application Priority Data

Jun. 27, 1987 [JP] Japan .................................. 62-160543
Oct. 30, 1987 [JP] Japan .................................. 62-276627

[51] Int. Cl.$^4$ ....................... G10K 11/00; C08L 27/00
[52] U.S. Cl. ................... 428/36.6; 74/473 R; 524/296; 524/525; 524/527; 525/225
[58] Field of Search ............. 92/47, 103 R; 74/473 R; 428/36.6; 464/175; 524/296, 525, 527; 525/225

[56] References Cited

U.S. PATENT DOCUMENTS

| | | | |
|---|---|---|---|
| 3,926,068 | 12/1975 | Jantzen et al. | 74/473 R |
| 4,237,998 | 12/1980 | Matayoshi | 181/200 |
| 4,424,834 | 1/1984 | Sumi et al. | 428/36.6 |
| 4,581,951 | 4/1986 | Watson | 74/473 R |
| 4,598,606 | 7/1986 | Foggini | 74/473 R |
| 4,735,596 | 4/1988 | Ukai et al. | 464/175 |

*Primary Examiner*—Ellis P. Robinson
*Assistant Examiner*—James J. Seidleck
*Attorney, Agent, or Firm*—Cushman, Darby & Cushman

[57] ABSTRACT

A boot for an automobile comprises two terminal annular parts and a barrel part intervening between the two terminal annular parts. This boot is obtained by injection molding a flexible PVC material. The flexible PVC material of one type (I) is composed of a polymer component and a plasticizer, which polymer component is obtained by blending high polymerization degree and low polymerization degree PVC's respectively having an average polymerization degree in specific ranges, with the mixing ratio of the two PVC's being in a specific range. The flexible PVC material of the other type (II) is composed of a polymer component and a plasticizer, which polymer component is obtained by blending a cross-linked resin having a non-gel component average polymerization degree and a cross-linking degree in respectively specific ranges with a non-cross-linked resin having an average polymerization degree in a specific range, with the mixing ratio of the two PVC's in a fixed range. The boot formed of the material of Group I or II incurs no layer separation even after a heat resisting test and induces no bleeding even after a light resisting test. The boot formed of the material of Group II acquires delustered appearance even when the metal die has not been treated by honing in advance.

12 Claims, 1 Drawing Sheet

BOOT FOR AUTOMOBILE

BACKGROUND OF THE INVENTION

This invention relates to a boot for an automobile, composed of two terminal annular parts and a barrel part intervening between the opposite terminal parts and formed of a flexible PVC material. Particularly this inventions aimed at a shift lever boot, for example, to be used in an automobile and therefore expected to, most of all, appeal to the eyes of the automobile driver and passengers.

For the sake of explanation the present invention will be described below with reference to a shift lever boot 7 comprising, as illustrated in FIG. 1, two terminal annular parts 1, 3, one small and the other large diameter, and a barrel part 5 intervening between the annular parts 1 and 3. This invention is not required to be limited to this particular construction. It does not discriminate the automobile boot on account of the presence or absence of an intervening corrugated barrel part.

Generally most of the shift lever boots currently in use are products obtained by injection molding flexible PVC material.

The polymer component used for the flexible PVC material is generally of a grade having an average polymerization degree (hereinafter referred to as "$\bar{P}$" for short) of about 2,500.

The shift lever boot, after protracted use on an automobile, develops the possibility that the barrel part thereof will yield to layer separation (swelling) and sustain heavy surface irregularities such as to impair the appearance of boot. Particularly when the automobile is left standing under intense heat in the summer, the interior of the automobile is heated to a very high temperature and the trouble of phase separation is brought on very quickly.

Mainly from the standpoint of design (color harmony of the automobile interior), shift lever boots of the delustered type are filling a growing demand.

Since PVC is capable of faithfully transferring a pattern on the surface of a metal die, such shift lever boots of the delustered type have been produced by using metal dies having surfaces treated by honing (one kind of crimping treatment).

When the number of injection molding cycles increases to the order of 5,000 to 10,000, the PVC material for injection molding buries the honed surface (crimpled surface) of metal die. When the metal die is washed for the removal of adhering PVC material, the honed surface thereof may be scraped off. If the metal die is further used, the shift lever boots are liable to be produced with a partially or wholly lustered surface. Thus, the metal die of the foregoing description has a disadvantage that it is liable to produce shaped articles of poor appearance.

Particularly shift lever boots of the type using a corrugated intervening barrel part has a disadvantage that, while in use in a cold district, their corrugated intervening barrel parts are liable to sustain cracks.

SUMMARY OF THE INVENTION

One aspect of this invention is directed to a boot for use in an automobile which is composed of two terminal annular parts and a barrel part intervening between the terminal annular parts and formed of flexible PVC material by injection molding, the flexible PVC material comprising 100 parts by weight of a polymer component and 80 to 130 parts by weight of a plasticizer, the polymer being a mixture of a high polymerization degree PVC and a low polymerization degree PVC respectively having a value of $\bar{P}$ in the range of 1,500 to 2,200 and a value of $\bar{P}$ in the range of 400 to 700, and the former PVC and the latter PVC being mixed in the range of 65/35 to 90/10 (by weight).

Owing to the construction described above, the automobile boot of the present invention yields to no layer separation even after a heat resisting test, shows no sign of bleeding even after a light resisting test, and retains a highly desirable appearance for a long time.

Another aspect of this invention is directed similarly to the first aspect mentioned above to a boot for use in an automobile which is composed of two terminal annular parts and a barrel part intervening between the terminal annular parts and formed of flexible PVC material by injection molding, the PVC material comprising 100 parts by weight of a polymer component and 100 to 130 parts by weight of a plasticizer, the polymer component being a PVC mixture obtained by blending a cross-linked resin of a high polymerization degree base having a THF-insoluble gel content in the range of 10 to 50 wt % and the THF-insoluble gel component having an average polymerization degree, $\bar{P}n$, in the range of 1,800 to 3,500 with a non-cross-linked resin of a low polymerization degree base having an average polymerization degree, $\bar{P}n$, in the range of 400 to 700, with the gravimetric ratio of the former resin to the latter resin in the range of 90/10 to 60/40.

Owing to the construction described above, the automobile boot (shift lever boot) of the present invention can be produced in a delustered appearance without requiring the cavity surface of the metal die to be treated by honing in advance. Further, the cavity surface of the metal die has no possibility of being worn out by cleansing. Even when the number of injection molding cycles reaches the order of 5,000 to 10,000, the metal die is still capable of producing delustered boots.

PREFERRED EMBODIMENT OF THE INVENTION

Figure 1:
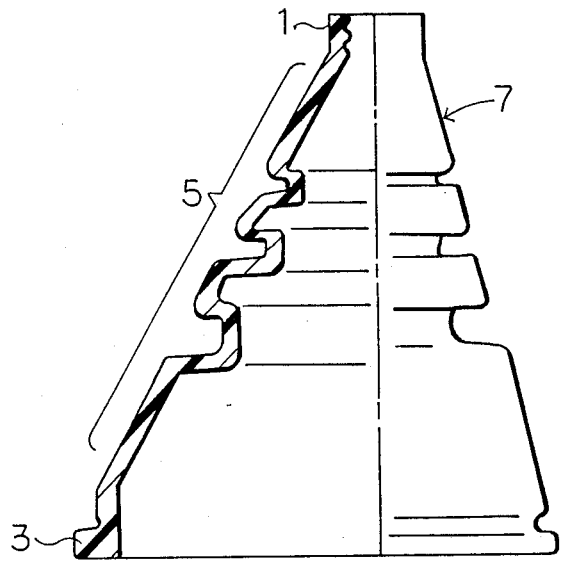
FIG. 1 is partly sectioned diagram of a shift lever boot in which the present invention can be embodied.

In the following description, composition units are units by weight unless otherwise specified. The average polymerization degree ($\bar{P}$) is based on the solution viscosity method defined in Japanese Industrial Standard (JIS) K6721.

Now, the present invention will be described below as embodied, for example, in a shift lever boot (a boot for use on an automobile) which, as illustrated in FIG. 1, comprises two terminal annular parts 1, 3 and a barrel part 5 intervening between the two annular members 1, 3.

This boot 7 of the present invention is a product obtained by injection molding a specific flexible PVC material [I] or [II].

[I] One flexible PVC material contemplated by this invention comprises 100 parts of a polymer component and 50 to 130 parts (preferably 100 to 125 parts) of a plasticizer used in combination with an auxiliary material such as a stabilizer. The polymer component is a mixture of a high polymerization degree PVC and a low polymerization degree PVC respectively having an average polymerization degree of 1,500 to 2,200 (preferably 1,700 to 2,150) and 400 to 700 (preferably 600 to 700). The gravimetric mixing ratio of the high polymerization degree PVC to the low polymerization degree PVC is in the range of 65/35 to 90/10 (preferably 70/30 to 85/15).

The polyvinyl chloride (PVC) to be used herein is not limited to the homopolymer of vinyl chloride but may embrace copolymers using vinyl chloride as a main comonomer.

As the plasticizer mentioned above, a phthalic acid ester type plasticizer such as, for example, di-2-ethylhexyl phthalate (DOP), diisononyl phthalate (DINP), or diisodecyl phthalate (DIDP) is generally used. Other examples of the plasticizer which is effective used herein include adipic ester type plasticizers such as dioctyl adipate (DOA), phosphoric ester type plasticizers such as tricredyl phosphate (TCP), epoxy compounds such as epoxidized soybean oil and linseed oil, and sebacic ester type plasticizers such asdibutyl sebacate (DBS). One member or a mixture of two or more members selected from the group of plasticizers enumerated above can be suitably used.

If the amount of the plasticizer to be used is less than 80 parts, it is incapable of imparting necessary flexibility to the produced boot. If this amount exceeds 130 parts, the produced boot is liable to induce a detestful phenomenon of bleeding (with impairment of appearance).

In the composition described above, if the average polymerization degree ($\bar{P}$) of the high polymerization degree PVC exceeds 2,200, if the average polymerization degree ($\bar{P}$) of the low polymerization degree PVC exceeds 700, or if the mixing ratio of the low polymerization degree PVC is lower than the aforementioned range, the produced shift lever boot suffers from phase separation.

If the mixing ratio of the lower polymerization degree PVC is larger than the aforementioned range, the produced boot is liable to suffer from bleeding and, during the preparation of the PVC material, the polymer component fails to absorb the plasticizer sufficiently and exhibits an inferior dry up property (rendering the pelletization of the PVC material highly difficult). If the average polymerization degree of the low polymerization degree PVC is less than 400, it is incapable of imparting necessary strength to the boot.

[II] The other flexible PVC material contemplated by the present invention fulfils the following conditions, (a) to (d).

(a) The amount of the plasticizer falls in the range of 100 to 130 parts, based on 100 parts of the resin.

If the amount of the aforementioned plasticizer is less than 100 parts, the boot possesses unduly high rigidity such as to impair flexibility and degrade the smoothness of operation of the shift lever. If this amount exceeds 130 parts, the shift lever boot is liable to induce the phenomenon of bleeding in a light resisting test. The bleeding is detrimental to the boot which catches the eyes of the automobile driver and passengers and exposes itself to ready contact with hands and clothes.

The plasticizer to be used in the flexible PVC material is the same as that already described above with reference to the first flexible PVC material of [I].

(b) The PVC resin is a mixture of a cross-linked resin with a non-cross-linked resin. The mixing ratio of the former resin to the latter resin (by weight) is in the range of 90/10 to 55/45.

If the mixing ratio of the non-cross-linked resin is smaller than the aforementioned range, the molded boot is liable to sustain layer separation on the surface thereof (with impaired appearance). If this mixing ratio is larger than the aforementioned range, the produced boot is liable to induce the phenomenon of bleeding of plasticizer in the light resisting test.

(c) The cross-linked resin has a gel content in the range of 10 to 50% by weight. The non-gel portion of the resin has an average polymerization degree ($\bar{P}$) in the range of 1,800 to 3,500.

The gel content is defined as follows.

The gel content is determined by placing in a glass beaker having an inner volume of 500 ml, a given cross-linked resin weighed out accurately in 2 g and 400 g of tetrahydrofuran (THF), stirring them at room temperature for one hour for solution, passing the resultant solution through a filter to separate insolubles of cross-linked vinyl chloride polymer, drying the separated insolubles, weighing the dried insolubles to find the weight ($W_1$) (gram), and performing a calculation of the following formula using the found weight.

$$\text{Gel content } (\%) = \frac{W_1}{2} \times 100$$

This gel content serves as a relative criterion of the cross-linking degree of the resin. The sample for the determination of the non-gel component's average polymerization degree is obtained by reextracting from methanol the filtrate resulting from the filtration of the THF solution through the filter and then drying the product of the re-extraction.

If the average polymerization degree, $\bar{P}$, is less than 1,000, the produced boot permits ready bleeding of the plasticizer in the light resisting test and is liable to induce layer separation on the surface.

(d) The non-cross-linked resin has an average polymerization degree, $\bar{P}n$, in the range of 400 to 700.

If this average polymerization degree is less than 400, the PVC material is deficient in workability. If it exceeds, 700, the boot is liable to induce layer separation on the surface.

Generally, the PVC material [I] or [II] incorporates therein a stabilizer and other auxiliaries.

As examples of the stabilizer, metallic soaps such as barium lead, calcium, and cadmium stearates; organic tin compounds such as dibutyl tin dilaurate and maleate and organic tin mercaptide and sulfonamide; and organic and inorganic lead compounds such as lead tribasic sulfate, lead dibasic phosphite, lead tribasic phthalate, and lead dibasic phthalate can be cited. The stabilizer can be used in combination with an epoxy compound, a phosphorous ester, a polyol, or a hindered phenol.

As examples of other auxiliaries, organic fillers such as calcium carbonate, talc, and clay, fabricating agents of polymethyl methacrylate type and polyester type, and pigments can be cited. One member or a mixture of two or more members suitably selected from the group of auxiliaries enumerated above can be used.

Incidentally, the aforementioned PVC material of [II] is disclosed in U.S. Pat. No. 4,567,217 as useful in a steering wheel.

The automobile boot contemplated by this invention is formed of the PVC material obtained by incorporating a plasticizer into the polymer component which is a mixture of high polymerization degree and low polymerization degree PVC's respectively possessing average polymerization degrees in specific ranges in a specific mixing ratio. Owing to this particular construction, the boot induces no layer separation even after the heat resisting test, incurs no bleeding even after the light resisting test, and retains highly desirable appearance and quality for a long time.

The desirable quality of the boot may be explained as follows. The layer separation may be logically explained by a postulate that during the course of the injection molding, the portion of the material in contact with the metal die cools and solidifies quickly, whereas the inner portion cools slowly and retains flowability and the material is allowed to flow through the inner portion and, as the result, a boundary is formed in the surface portion and this boundary gives rise to layer separation after the material is molded. In contrast in the present invention, since the melt viscosity of the material is so low that the material flows easily even in the portion close to the surface, no clear boundary is formed in the surface portion and no phase separation is induced.

The shift lever boot made of the PVC material of [II] enjoys a delustered appearance in addition to the advantage of the boot made of the PVC material of [I] mentioned above.

EXAMPLES

Now, experiments performed for demonstrating the effect of this invention will be cited below as working examples, in combination with comparative experiments.

Group [I]

Shift lever boots of the shape illustrated in FIG. 1 were obtained by injection molding PVC materials of varying compositions shown in Table 1. The materials prepared were tested for dry up property and the produced boots were tested for various properties indicated below.

Test (1): Occurrence of layer separation—A sample was tested for heat resistance (500 hours' standing at 80° C.) and then visually examined in search of sign of phase separation.

Test (2): Occurrence of bleeding of plasticizer—A sample was tested for light resistance (400 hours' standing in a fade-o-meter, under a black panel temperature at 60° C.) and then visually examined in search of sign of bleeding of plasticizer.

It is clearly noted from Table 1 showing the test results that the samples of Examples i and ii both fulfilling the requirements of this invention incurred neither phase separation nor bleeding and exhibited highly desirable dry up property, whereas the samples of Comparative Experiments i to ix not fulfilling the requirements of this invention betrayed some drawbacks or others.

The systems using independent polymer components instead of a mixture of low polymerization degree and high polymerization degree polymers incurred either bleeding (Comparative Experiment i using a medium polymerization degree polymer) or layer separation (Comparative Experiments iii, v, and vii using high polymerization degree polymers). In Comparative Experiment ii which used the aforementioned mixed polymer and had the mixing ratio in the range of the present invention but the average polymerization degree, $\overline{P}$, of the high polymerization degree not reaching the lower limit of 1,500, bleeding occurred and the dry up property was inferior, though no layer separation occurred. In the case of Comparative Experiment iiX in which the average polymerization degree, $\overline{P}$, of the high polymerization degree PVC exceeded 2,200, the layer separation occurred. In the case of Comparative Experiments iv, vi, and ix in which the mixing ratio of the low polymerization degree PVC was unduly large, the bleeding occurred and the dryup property was inferior, though no layer separation occurred.

Group [II]

Boots of the shape illustrated in FIG. 1 were obtained by injection molding PVC composition of varying formulas shown in Tables 2 and 3, with a metal die using a cavity surface (grain A).

The boots were tested for the following properties (1) to (4) and rated on the scales indicated correspondingly.

Test (1): Test for gloss

This property was tested with a measuring machine (produced by Suga Shikenki K.K. and marketed under product code of "HA-GS"), and rated on the two-point scale, wherein:

o for less than 3 of gloss degree
x for at least 3 of gloss degree

Test (2): Test for light resistance

This property was determined by exposing a sample to a fade-o-meter, B.P. 63° C. × 400 h and visually examining the sample on the three-point scale, wherein o for absence of abnormality
Δ for slight bleeding
x for conspicuous bleeding Test (3): Occurrence of layer separation (after molding)

o for absence of abnormality
Δ for slight layer separation
x for conspicuous layer separation Test (4): Test for low-temperature operating property This property was determined by setting a sample boot on a 5-speed shift lever and carrying out 50 cycles of the shifts R (reverse)↔5 speeds at a temperature of −30° C.

o for absence of abnormality
Δ for occurrence of slight cracks
x for occurrence of conspicuous cracks The test results are shown in Tables 2 and 3. In all the working examples, the boots showed highly desirable delustered appearance and passed their tests with good results. In the comparative experiments, the boots were found to be deficient in luster or other items. In Comparative Experiments 1 to 3 in which only cross-linked resins were used as PVC resins, the boots incurred layer separation on the surface and exhibited no satisfactory cold resistance (low temperature operating property), though they possessed delustered appearance. In Comparative Experiments 4 to 12 in which non-cross-linked PVC resins alone were used, the boots failed to acquire a delustered appearance in spite of a change in the combination of $\overline{P}$'s. In Comparative Experiments 7 to 12 in which resins of high $\overline{P}$ were contained, the boots were deficient in cold resistance and light resistance.

By the inventors' experiment, it was demonstrated that the cavity surface of the metal die had to be washed for removal of adhering PVC material at intervals of 10,000 cycles of injection molding in the experiments using the PVC material of this invention, whereas the washing was required at intervals of 5,000 cycles of injection molding in the comparative experiments using the conventional PVC material.

While the present invention has been described by means of specific embodiments, it is to be understood that numerous changes and modifications may be made therein without departing from the spirit and scope of the invention as defined in the appended claims.

What is claimed is:

1. A boot for an automobile, comprising two terminal annular parts and a barrel part intervening between said two terminal annular parts and obtained by injection molding a flexible polyvinyl chloride (PVC) material, said PVC material consisting essentially of 100 parts by weight of a polymer, component, 80 to 130 parts by weight of a plasticizer and a stabilizer, said polymer

TABLE 1

|             |                            | Comparative Experiment | | | Example | Comparative Experiment | | Example | Comparative Experiment | | | |
|---|---|---|---|---|---|---|---|---|---|---|---|---|
|             |                            | i | ii | iii | i | iv | v | ii | vi | vii | viii | ix |
| Composition | PVC resin ($\overline{P}$ = 1,450) | 100 | 80 | | | | | | | | | |
|             | PVC resin ($\overline{P}$ = 1,800) | | | 100 | 80 | 60 | | | | | | |
|             | PVC resin ($\overline{P}$ = 2,100) | | | | | | 100 | 80 | 60 | | | |
|             | PVC resin ($\overline{P}$ = 2,500) | | | | | | | | | 100 | 80 | 60 |
|             | PVC resin ($\overline{P}$ = 700) | | 20 | | 20 | 40 | | 20 | 40 | | 20 | 40 |
|             | DOP                        | 120 | " | " | " | " | " | " | " | " | " | " |
|             | Ba—Zn stabilizer           | 2 | " | " | " | " | " | " | " | " | " | " |
| Test item   | Dryup property             | o | x | o | o | x | o | o | x | o | o | x |
|             | Layer separation           | o | o | x | o | o | x | o | o | x | x | o |
|             | Bleeding of plasticizer    | x | x | o | o | x | o | o | x | o | o | x | o Good or absence of abnormality
x Inferior or presence of abnormality

TABLE 2

| | | Comparative Experiment | | | Example | | | | | | | | | | | |
|---|---|---|---|---|---|---|---|---|---|---|---|---|---|---|---|---|
| | | 1 | 2 | 3 | 1 | 2 | 3 | 4 | 5 | 6 | 7 | 8 | 9 | 10 | 11 | 12 |
| Composition | Cross-linked resin *1 ($\overline{P}$ = 1,800) | 100 | 100 | 100 | 80 | 80 | 80 | 60 | 60 | 60 | | | | | | |
| | Cross-linked resin *1 ($\overline{P}$ = 2,500) | | | | | | | | | | 80 | 80 | 80 | | | |
| | Cross-linked resin *1 ($\overline{P}$ = 3,500) | | | | | | | | | | | | | 60 | 60 | 60 |
| | Non-cross-linked resin ($\overline{P}$ = 700) | | | | 20 | 20 | 20 | 40 | 40 | 40 | 20 | 20 | 20 | 40 | 40 | 40 |
| | Plasticizer DOP | 120 | | | 120 | | | 120 | | | 120 | | | 120 | | |
| | Plasticizer DINP | | 120 | | | 120 | | | 120 | | | 120 | | | 120 | |
| | Plasticizer DIDP | | | 120 | | | 120 | | | 120 | | | 120 | | | 120 |
| | Stabilizer (Ba—Zn type) | 2 | 2 | 2 | 2 | 2 | 2 | 2 | 2 | 2 | 2 | 2 | 2 | 2 | 2 | 2 |
| Test item | (1) Luster | o | o | o | o | o | o | o | o | o | o | o | o | o | o | o |
| | (2) Light resistance | o | o | o | o | o | o | o | o | o | o | o | o | o | o | o |
| | (3) Layer separation | x | x | x | o | o | o | o | o | o | o | o | o | o | o | o |
| | (4) Low-temperature operating property | Δ | Δ | Δ | o | o | o | o | o | o | o | o | o | o | o | o |

*1 THF-insoluble gel content: 25 wt %

TABLE 3

| | | Comparative Experiment | | | | | | | | |
|---|---|---|---|---|---|---|---|---|---|---|
| | | 4 | 5 | 6 | 7 | 8 | 9 | 10 | 11 | 12 |
| Composition | Non-cross-linked resin ($\overline{P}$ = 1,800) | 80 | 80 | 80 | | | | | | |
| | Non-cross-linked resin ($\overline{P}$ = 2,500) | | | | 80 | 80 | 80 | | | |
| | Non-cross-linked resin ($\overline{P}$ = 3,500) | | | | | | | 60 | 60 | 60 |
| | Non-cross-linked resin ($\overline{P}$ = 700) | 20 | 20 | 20 | 20 | 20 | 20 | 40 | 40 | 40 |
| | Plasticizer DOP | 120 | | | 120 | | | 120 | | |
| | Plasticizer DINP | | 120 | | | 120 | | | 120 | |
| | Plasticizer DIDP | | | 120 | | | 120 | | | 120 |
| | Stabilizer (Ba—Zn type) | 2 | 2 | 2 | 2 | 2 | 2 | 2 | 2 | 2 |
| Test item | (1) Luster | x | x | x | x | x | x | x | x | x |
| | (2) Light resistance | o | o | o | o | o | o | Δ | Δ | Δ |
| | (3) Layer separation | o | o | o | o | o | o | o | o | o |
| | (4) Low-temperature operating property | o | o | o | Δ | Δ | Δ | Δ | Δ | Δ | component being a mixture of a high polymerization degree and low polymerization degree PVC's respectively possessing average polymerization degrees in the range of 1,500 to 2,200 and 400 to 700, and the mixing ratio of the former to the latter (by weight ratio) being in the range of 65/35 to 90/10.

2. The boot according to claim 1, wherein said high polymerization degree and low polymerization degree PVC's are each a homopolymer or a copolymer.

3. The boot according to claim 2, wherein said high-polymerization degree and low polymerization degree PVC's are each a homopolymer.

4. The boot according to claim 1, wherein the amount of said plasticizer to be incorporated is in the range of 110 to 125 parts by weight.

5. The boot according to claim 1, wherein said plasticizer is one phthalic ester or a mixture of two or more phthalic esters.

6. The boot according to claim 1, wherein said high polymerization degree PVC has an average polymerization degree ($\overline{P}$) in the range of 1,700 to 2,150.

7. The boot according to claim 1, wherein said low polymerization degree PVC has an average polymerization degree ($\overline{P}$) in the range of 600 to 700.

8. The boot according to claim 1, wherein the mixing ratio of said high polymerization degree PVC to said low polymerization degree PVC is in the range of 70/30 to 85/15 (by weight).

9. A boot for an automobile, comprising two terminal annular parts and a barrel part intervening between said two terminal annular parts and obtained by injection molding a flexible polyvinyl chloride (PVC) material, said flexible PVC material satisfying the following requirements:

(a) the amount of a plasticizer to be incorporated is in the range of 100 to 130 parts by weight, based on 100 parts by weight of PVC resin, (b) said PVC resin is a mixture of a cross-linked resin with a non-cross-linked resin, with the mixing ratio of the former to the latter in the range of 90/10 to 55/45 (by weight), (c) said cross-linked resin has a gel content in the range of 10 to 50% by weight and the non-gel component thereof has an average polymerization degree ($\overline{P}$) in the range of 1,750 to 3,550, and (d) said non-cross-linked resin has an average polymerization degree ($\overline{P}$) in the range of 400 to 700.

10. A boot according to claim 9, wherein the amount of a plasticizer to be incorporated is in the range of 110 to 130 parts by weight.

11. The boot according to claim 9, wherein said plasticizer is one phthalic ester or a mixture of two or more phthalic esters.

12. The boot according to claim 9, wherein said non-cross-linked resin has an average polymerization degree ($\overline{P}$) in the range of 600 to 700.

* * * * *